G. NEILSON.
Coffee Pot.
No. 25,909.
Patented Oct. 25, 1859.
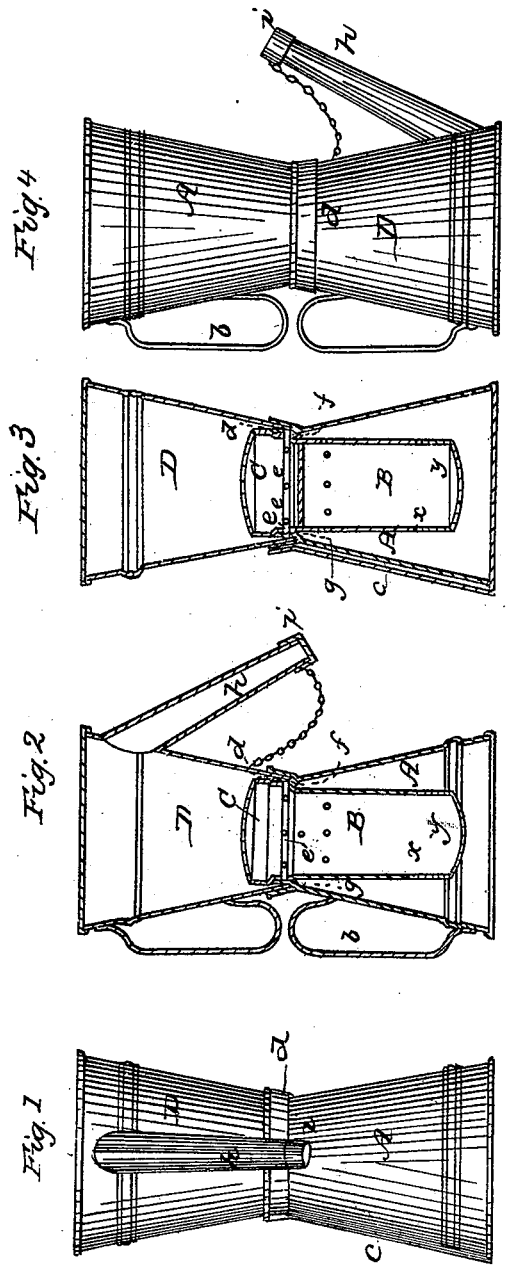
WITNESSES
INVENTOR
George Neilson

UNITED STATES PATENT OFFICE.

GEORGE NEILSON, OF BOSTON, MASSACHUSETTS.

COFFEE-POT.

Specification of Letters Patent No. 25,909, dated October 25, 1859.

*To all whom it may concern:*

Be it known that I, GEORGE NEILSON, of Boston, in the county of Suffolk and State of Massachusetts, have invented a new and useful or Improved Reversible Catetière or Apparatus for Making Coffee, etc., and I do hereby declare that the same is fully described and represented in the following specification and the accompanying drawings, of which—

Figure 1, is a front elevation, Fig. 2, a longitudinal and vertical section, and Fig. 3, a transverse section of it.

In the drawings, A, exhibits a pot or boiling vessel constructed in the shape of a truncated cone or having any other suitable form. The said pot A, is furnished with a handle, b, and with a pipe, c, leading down one side of it and being open at top and made to open at or near its lower end into the lower part of the pot, A, as shown in Fig. 3. Furthermore, the upper part of the vessel A is surrounded by a trough, d, whose inner edge is perforated with one or more holes, e, arranged somewhat below its outer edge; or the said inner edge instead of having holes in it disposed with respect to the outer edge as described, may be constructed somewhat below the level of the outer edge of the trough. Within the said vessel A there is a deep filtering biggin or long box, B, whose bottom and sides are foraminous as shown at x, y. The said biggin is supported in the vessel A, by means of a lip f, extending from the upper edge of the biggin and resting upon a corresponding lip, g, projecting from the inner surface of the upper part of the vessel, A. A foraminous cap or strainer, C, fits closely upon the top of the vessel A, or within the same.

In connection with such parts A, B and C, I employ what is usually called a common tea or coffee pot D, furnished with a projecting nose or spout h, having a cap or cover i. This coffee pot D, is to be placed upon the vessel A, and to extend into the trough d, as shown in Figs. 1, 2, and 3.

In using the apparatus so constructed, the ground coffee, or material from which a decoction is to be made, it to be placed within the filtering biggin, B, the vessel, A, being supplied with a sufficient amount of water; next, the filtering biggin is to be inserted within the vessel, A, and the whole should be covered by a foraminous cap, C. Finally, the coffee pot, D, or condenser, as it may be termed is to be inverted and inserted in the trough, d, and over the cap, C, in manner as shown in Fig. 2, the cover, i, being fitted upon the discharging end of the spout, h. Under this state of things, the vessel A, should be arranged over a fire and heated so as to cause the water within it to boil. As the steam may rise from such water it will pass through the coffee in the filtering biggin, or will escape from the filtering biggin and through the foraminous cap, C, and into the condenser or pot, D, wherein it will be condensed and will run down on the inner surface of the said pot and be discharged into the trough, d. After the said trough may have been filled to the level of its holes, e, the overflow of the liquid will pass through the said holes, e, and into the filtering biggin, and finally, after percolating or running through the coffee therein, such overflow, will find its way back into or will mix with the contents of the vessel, A. The trough, d, serves the purpose of a water or liquid sealing joint and prevents the escape of steam from the vessel, D. After the liquid in the vessel, A, may have been heated a sufficient length of time, the whole apparatus should be reversed or turned over in manner as represented in Fig. 4, wherein the coffee pot is shown as below the vessel, A. Under this state of things, the hot water or decoction within the vessel, A, will pass through the filtering biggin and its contents and be received into the pot D, the liquid being filtered while passing through the contents of the filtering biggin. After this has been accomplished, the vessel A, and the filtering biggin may be removed from the coffee pot, D, and the latter be covered by a common cap or cover. By means of the pipe, c, air will rush into the vessel, A, while it is in the position exhibited in Fig. 4, the same serving to prevent atmospheric pressure from operating to diminish the flowage of liquid from the upper into the lower vessel. Furthermore, the pipe, c, will be a tell-tale to exhibit when pressure of steam within the vessel, D, may become too great, for in this case some of the liquid contents of the said vessel will be liable to be discharged out of the open end of said pipe.

By means of my reversible cafetière, the aroma of the coffee will be retained in the decoction.

I claim—

1. The reversible cafetière, as composed of the boiler A, the filtering biggin B, the foraminous cap or strainer, C, and the condenser or coffee pot D, having a spout, $h$, and cap, $i$, the whole being arranged in manner and so as to operate as hereinbefore explained.

2. I also claim the combination of the air and tell-tale pipe, $c$, with the boiling vessel A, the condensing vessel, D, the biggin, B, and the strainer or cap, C, the object or purposes of the said pipe being as explained.

GEORGE NEILSON.

Witnesses:
R. H. Eddy,
F. P. Hale, Jr.